US011486098B2

(12) United States Patent
Reed et al.

(10) Patent No.: US 11,486,098 B2
(45) Date of Patent: Nov. 1, 2022

(54) THERMAL LOCKOUT FOR A MOTOR OF A GATE CROSSING MECHANISM

(71) Applicant: Siemens Mobility, Inc., New York, NY (US)

(72) Inventors: Quinton Reed, Oil City, PA (US); Leah Chowenhill, Pittsburgh, PA (US)

(73) Assignee: Siemens Mobility, Inc., New York, NY (US)

( * ) Notice: Subject to any disclaimer, the term of this patent is extended or adjusted under 35 U.S.C. 154(b) by 393 days.

(21) Appl. No.: 16/799,900

(22) Filed: Feb. 25, 2020

(65) Prior Publication Data
US 2021/0262172 A1    Aug. 26, 2021

(51) Int. Cl.
| | |
|---|---|
| *E01B 7/28* | (2006.01) |
| *B61L 29/16* | (2006.01) |
| *E01F 13/06* | (2006.01) |
| *H02P 25/22* | (2006.01) |
| *H02P 29/024* | (2016.01) |

(52) U.S. Cl.
CPC ............ *E01B 7/28* (2013.01); *B61L 29/16* (2013.01); *E01F 13/06* (2013.01); *H02P 25/22* (2013.01); *H02P 29/024* (2013.01)

(58) Field of Classification Search
CPC ........... E01B 7/28; H02P 25/22; H02P 29/024
USPC ......................................... 318/558; 246/465
See application file for complete search history.

(56) References Cited

U.S. PATENT DOCUMENTS

| | | | | |
|---|---|---|---|---|
| 8,222,846 B2 * | 7/2012 | Sugie | ...................... | H02P 6/085 |
| | | | | 318/400.29 |
| 8,587,235 B2 * | 11/2013 | Yamato | ................. | H02P 29/032 |
| | | | | 318/400.15 |

FOREIGN PATENT DOCUMENTS

| | | |
|---|---|---|
| JP | 3410464 B2 | 5/2003 |
| JP | 2009061981 A | 3/2009 |

OTHER PUBLICATIONS

Jakov Vico et al: "Principles in Motor Protection", IEEE Industry Applications Magazine, IEEE Service Center, Nov. 2011, pp. 52-61, vol. 17, No. 6; Piscataway, NJ, US.

* cited by examiner

*Primary Examiner* — David Luo

(57) ABSTRACT

Examples described herein provide a computer-implemented method for thermal lockout for a motor of a gate crossing mechanism. The method includes monitoring a motor current across a sense resistor of the motor. The method further includes determining a present thermal capacity unit (TCU) at a time interval based on the motor current across the sense resistor. The method further includes determining whether the motor is at a thermal limit by comparing the present TCU to an expected TCU. The method further includes responsive to determining that the motor is at the thermal limit, causing initiating a hard fault.

20 Claims, 3 Drawing Sheets

THERMAL LOCKOUT FOR A MOTOR OF A GATE CROSSING MECHANISM

BACKGROUND

The present invention generally relates to a gate crossing mechanism, and more specifically, to techniques for thermal lockout for a motor of a gate crossing mechanism.

An intersection where a railway line crosses a road or path at the same grade is referred to as a level crossing. Level crossings utilize gate crossing mechanisms to control traffic on the road or path when a train or other vehicle is passing through the level crossing. The entrance gate crossing mechanisms prevent vehicles, pedestrians, etc., from crossing the railway line while the gate crossing mechanism is engaged (i.e. when a railway vehicle is approaching the crossing on the track). The exit gate crossing mechanisms prevent vehicles, pedestrians, etc from crossing the railway line while the gate crossing mechanism is not engaged (i.e. when no railway vehicle is approaching the crossing on the track), and the exit gate crossing mechanism allows vehicles, pedestrians, etc. to leave the railway line while the gate crossing mechanism is engaged (i.e. to avoid an oncoming railway vehicle on the tracks).

SUMMARY

Embodiments of the present invention are directed to thermal lockout for a motor of a gate crossing mechanism.

A non-limiting example computer-implemented method for thermal lockout for a motor of a gate crossing mechanism is provided. The method includes monitoring a motor current across a sense resistor of the motor. The method further includes determining a present thermal capacity unit (TCU) at a time interval based on the motor current across the sense resistor. The method further includes determining whether the motor is at a thermal limit by comparing the present TCU to an expected TCU. The method further includes responsive to determining that the motor is at the thermal limit, causing initiating a hard fault.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
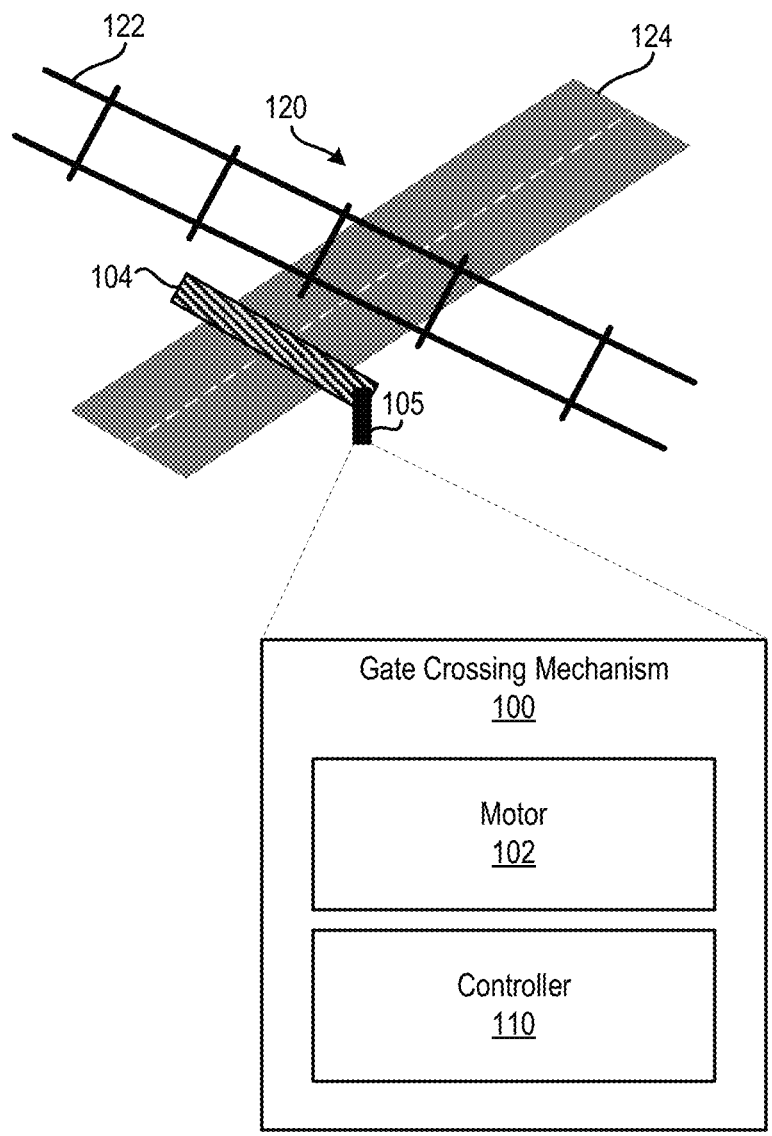
FIG. 1 depicts a block diagram of a processing system for a block diagram of a controller for a motor of a gate crossing mechanism according to one or more embodiments described herein.

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for a gate crossing mechanism, including techniques for controlling a gate crossing motor and/or detecting and/or preventing faults of the gate crossing motor. A gate crossing mechanism protects motorists, pedestrians, and the like from oncoming trains by either blocking level crossings or points at which public or private roads cross railway lines at the same level, or allowing for the exit of level crossings if a motorist, pedestrian, etc becomes stuck on the tracks.

As one example, a gate crossing mechanism can include an arm or "gate" that, using a motor, selectively lowers/raises depending upon whether a train or other vehicle is passing through the level crossing and whether it is functioning as an exit or entrance gate. For example, if a train is approaching a level crossing, an entrance gate can be lowered to prevent traffic on the road or path from crossing the railway line. A level crossing can be equipped with multiple gate crossing mechanisms. For example, each side of the railway line can include a gate crossing mechanism. In larger intersections, each side of the railway line can include two (or more) gate crossing mechanisms. Gate crossing mechanisms can further include lights, sirens, bells, sidewalk gates, or other similar devices that can provide visual and/or aural warnings.

Conventional gate crossing mechanisms can be susceptible to failures, malfunctions, etc., which can reduce their ability to control a level crossing safely. It is therefore describable to improve efficiency, reliability, and functionality of conventional gate crossing mechanisms.

The above-described aspects of the invention address the shortcomings of the prior art by providing techniques for improving the efficiency, reliability, and functionality of gate crossing mechanisms. Such aspects can include fault detection of a gate crossing motor, overspeed protection of a gate crossing motor, direction control of a gate crossing motor, and thermal lockout of a gate crossing motor.

Gate crossing mechanisms having the features and functionality described herein provide improve efficiency and address problems associated with conventional gate crossing mechanisms. For example, a gate crossing mechanism can include a brushless motor and digital control logic rather than a conventional brushed motor and mechanical cams. Motor brushes can experience uneven wear patterns, after which they must be replaced. This is both costly and time consuming for railways or those responsible for maintaining gate crossing mechanisms featuring brushed motors. Moreover, whereas conventional gate crossing mechanisms having brushed motors required more than two cams, the brushless motors of the gate crossing mechanisms described herein can use substantially less than eight cams (e.g., two cams).

Additionally, the brushless motors of the gate crossing mechanisms described herein provide expanded fault detection such as overcurrent and overtemperature detection, which can be determined from measured three-phase motor currents. This active fault detection serves to increase the availability of the gate crossing mechanism. The brushless motors of the gate crossing mechanisms described herein also provide an improved user interface to give maintainers clear feedback on gate configuration. This improves efficiency and accuracy for maintainers to set gate attributes in the field, thereby decreasing human error. Finally, the brushless motors of the gate crossing mechanisms described herein support a configurable gate which can function as either an entrance or an exit gate, which can depend for example the FPGA firmware. This is a stark difference from the conventional gate crossing mechanisms, which can only function as an entrance gate unless an additional logic card is attached and different hardware is utilized.

Turning now to FIG. 1, a block diagram of a controller 110 for a motor 102 of a gate crossing mechanism 100 is depicted according to one or more embodiments described herein. In this example, the gate crossing mechanism 100 includes the motor 102, the controller 110, and a gate 104. The gate 104 can be supported by any suitable structure, such as a gate support 105. The controller 110 and/or the motor 102 can be coupled to, incorporated in, or otherwise associated with the gate 104 and/or the gate support 105. The gate crossing mechanism 100 controls the gate 104 at a crossing 120 of a railway 122 and a road 124. The gate 104, when in a "down" or "closed" position, prevents traffic traveling along the road 124 from crossing the intersection 120. In examples, the intersection can be controlled by additional gate crossing mechanisms (not shown). In some examples, the motor 102 is a three-phase brushless motor.

Gate crossing mechanisms, such as the gate crossing mechanism 100, can experience faults which can cause the motor 102 to overheat. In such cases, the gate crossing mechanism 100 defaults to a "safe" state. For example, an entrance gate (i.e., a gate that crosses a portion of the road 124 with traffic flowing towards the intersection 120 when a railway vehicle is approaching on the track) defaults to a down position (e.g., approximately horizontal) to prevent vehicles from entering the intersection 120. As another example, an exit gate (i.e., a gate that crosses a portion of the road 124 with traffic flowing away from the intersection 120 when a railway vehicle is approaching on the track) defaults to an up position (e.g., approximately vertical, approximately 70 degrees relative to horizontal, etc.) to allow vehicles to exit the intersection 120. Thus, for entrance gates, the down state is considered the safe state while the up state is considered the safe state for exit gates.

When a fault occurs in the gate crossing mechanism 100, the controller 110 can implement a waiting time that the gate crossing mechanism should wait prior to initiating another movement (such as raising the gate 104). An example of a fault is that the motor 102 is stopped or stalled as described in more detail herein. Another example of a fault is that the motor is at or nearing its thermal (temperature) limit for safe operation. The present techniques provide for monitoring current and temperature characteristics of the motor 102 to detect such faults and prevent damage to the motor 102 by implementing waiting periods before using the motor again. For example, the motor 102 can be monitored by sensing motor current through a sense resistor (e.g., the current sense resistors 212 of FIG. 2) in each phase of the inverter (e.g., the three-phase inverter 210 of FIG. 2) that drives the motor 102.

Figure 2:
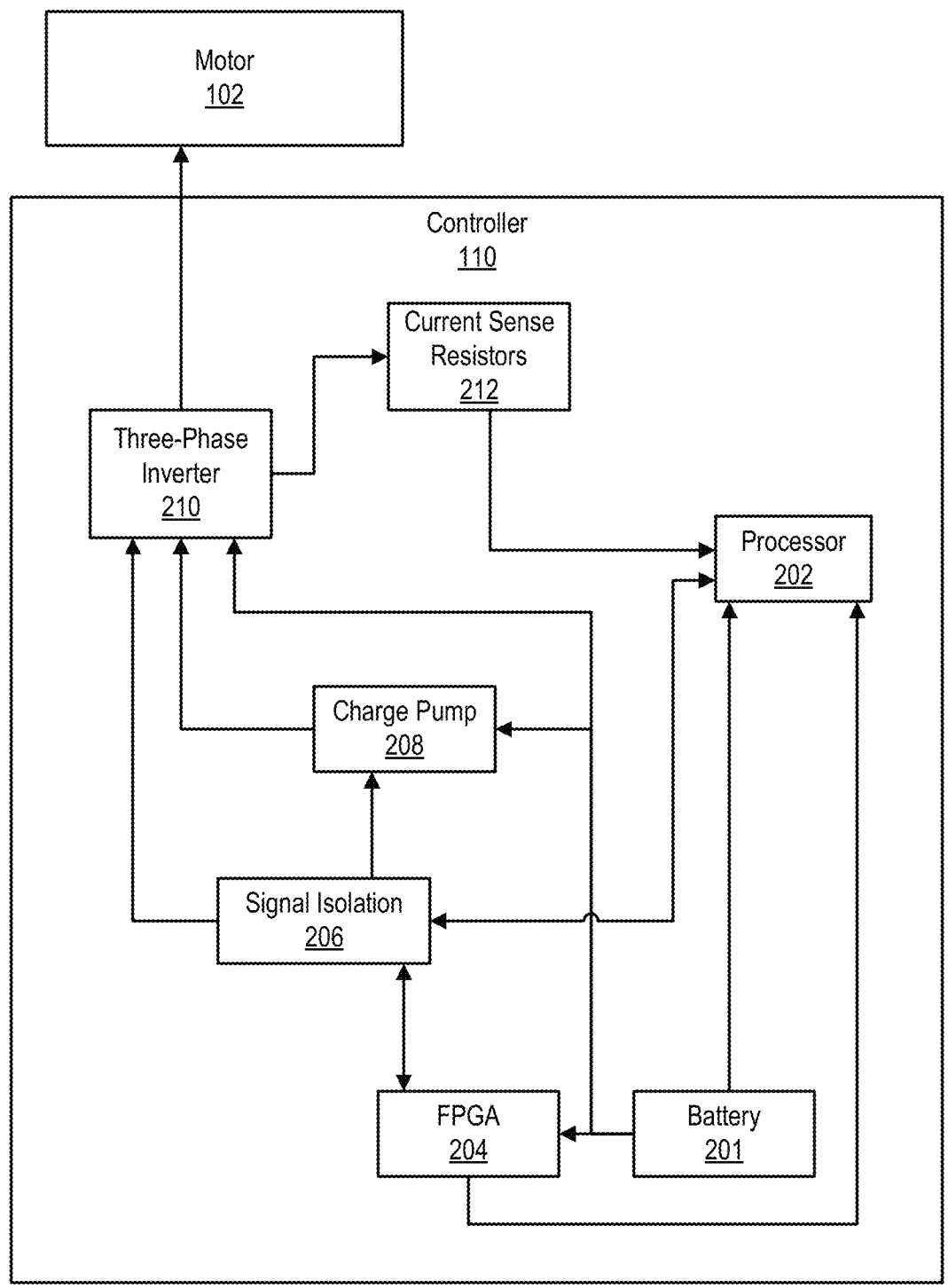
FIG. 2 depicts a block diagram of the controller of FIG. 1 being configured for thermal lockout for the motor of FIG. 1 according to one or more embodiments described herein.

FIG. 2 depicts a block diagram of the controller 110 of FIG. 1 being configured for thermal lockout for the motor 102 of FIG. 1. According to one or more embodiments described herein, the controller 110 can include various components configured and arranged as shown.

As one example, the controller 110 includes a processor 202, a field-programmable gate array (FPGA) 204, a signal isolation block 206, a charge pump 208, a three-phase inverter 210, and current sense resistors 212. In a three-phase motor, such as the motor 102, three current sense resistors are utilized. However, more or fewer sense resistors can be utilized in other examples. In some examples, the processor 202 includes an analog-to-digital converter (ADC). As shown in FIG. 2, one or more of the processor 202, the FPGA 204, the charge pump 208, and/or the three-phase inverter 210 can be powered by a battery 201, although any suitable power source can be used. The three-phase inverter 210 drives the motor 102.

The processor 202 monitors the current and temperature characteristics of the motor 102 to determine whether the motor 102 is operating normally or whether the motor 102 is in an error condition. When a fault occurs in the gate crossing mechanism 100, the processor 202 signals a hard fault to the FPGA 204 of the controller 110. The FPGA 204, for an entrance gate, releases a brake relay (not shown) and the (entrance) gate 104 of the gate crossing mechanism 100 moves to its default/safe state (e.g., down). For an exit gate, the FPGA 204 releases the brake relay (not shown) and the (exit) gate 104 of the gate crossing mechanism 100 moves to its default/safe state (e.g., 70 degrees from horizontal). The processor 202 tracks the total thermal expenditure of the motor based on its previous movements or its last attempt where a hard fault occurred. If, due to the hard fault or other factors, the processor 202 calculates that the motor 102 has used up too much of its TCU and will not be able to reach a next state (up or down depending on current state) without another fault, the processor 202 will continue to assert the hard fault signal to the FPGA 204 until there has been enough cool down time to meet a minimum amount of TCU remaining requirement, which is based on manufacturer's specifications for the motor and/or through testing, for example. This allows the gate crossing mechanism 100 to be predictive and not attempt movement unless the motor can physically and safely complete the movement. This also decreases maintenance needed on the brushless motor (e.g., the motor 102) as running the motor in an overcurrent/overtemperature state decreases the lifetime of the motor over time and possibly stops the motor from functioning. In some cases, the motor 102 can experience a "soft fault" in which an initial alert is sent to the FPGA 204 that the motor 102 is moving towards a hard fault state.

Figure 3:
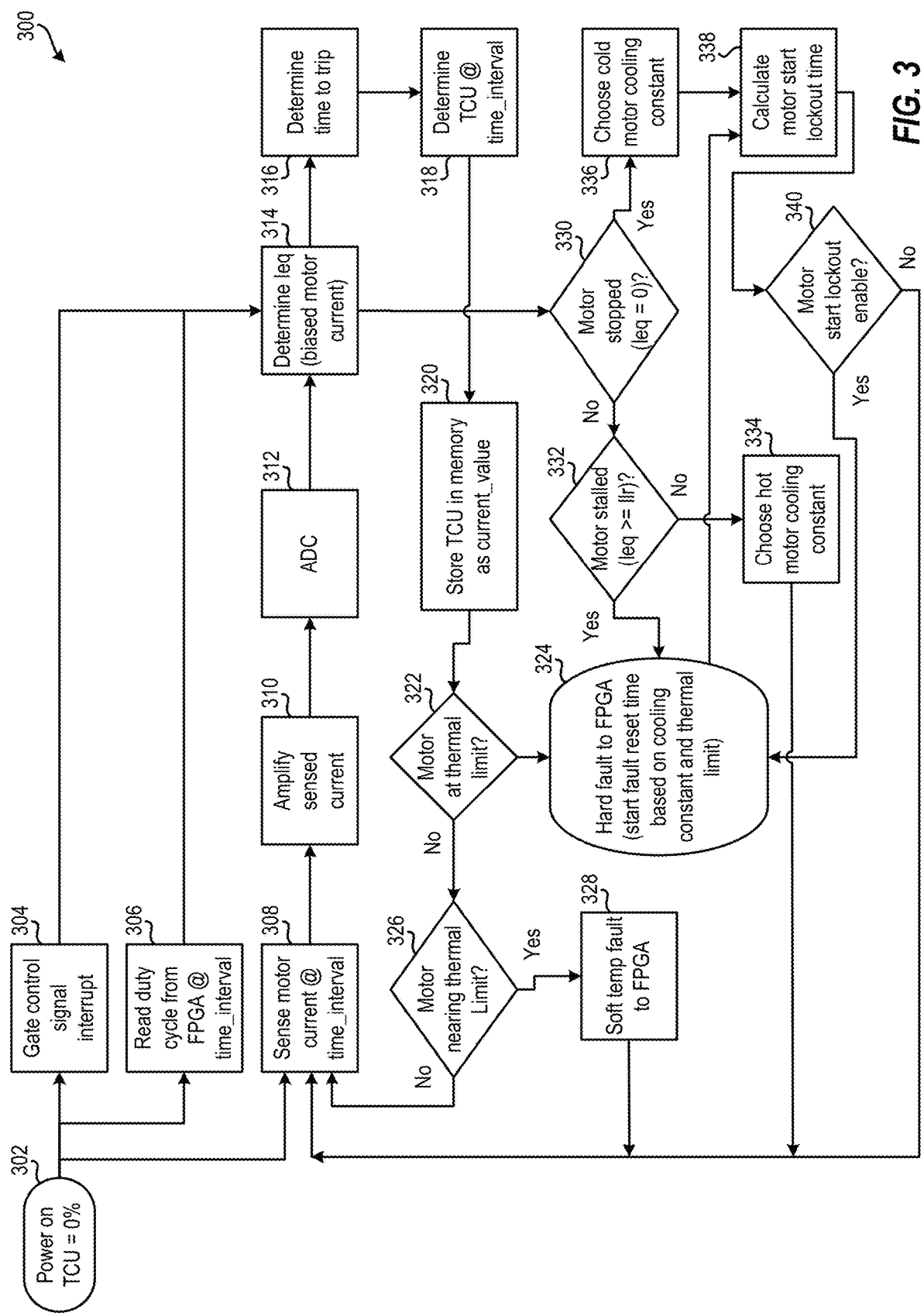
FIG. 3 depicts a flow diagram of a method for thermal lockout for the motor of FIG. 1 according to one or more embodiments described herein.

The features and functionality of the blocks of FIG. 2 are now described with reference to FIG. 3. In particular, FIG. 3 depicts a flow diagram of a method 300 for thermal lockout for the motor 102 of FIG. 1 according to one or more embodiments described herein. One or more of the blocks of the method 300 can be performed by the controller 110 of FIGS. 1 and 2, for example. As one such example, the processor 202 of the controller 110 is performing one or more of the functions described regarding the blocks of the method of FIG. 3. It should be appreciated that, in some examples, one or more of the blocks of the method 300 are implemented on or using an FPGA (e.g., the FPGA 204) and/or one or more other blocks of the method 300 are implemented on or using a processor (e.g., the processor 202).

At block 302, the motor 102 powers on and the thermal capacity unit (TCU) for the motor is 0% because the motor 102 has just received power. At block 304, a gate control signal interrupt is received by the processor 202 from the signal isolation 206, for example, via a two-wire interface that signals whether the gate 104 of the gate crossing mechanism 100 should be going up or going down. For example, if the gate 104 is an entrance gate, a logic high (or "1") signal indicates the gate 104 should go up, while a logic low (or "0") signal indicates that the gate 104 should go down. The logic is inverted for an exit gate. For example, if the gate 104 is an exit gate, a logic high (or "1") signal indicates the gate 104 should go down, while a logic low (or "0") signal indicates that the gate 104 should go up.

At block 306, the processor 202 reads a duty cycle from the FPGA 204 of the controller 110 at a time interval. In examples, the time interval can depend on the type/make/model of the motor 102.

At block 308, the current sense resistors 212 sense motor current of the motor 102 through each phase of the three-phase motor (i.e., the motor 102) at the time interval. The sensed motor current is amplified at block 310, and an analog-to-digital conversion occurs at block 312 to convert the sensed analog values to corresponding digital values. The gate control signal interrupt tells the processor 202 what the next state of the motor 102 will be. The duty cycle from the FPGA 204 tells the processor how fast the motor 102 is moving. These two variables, along with the sensed inverter phase currents, are used to calculate the Ieq in block 314. In particular, at block 314, the processor 202 determines an equivalent current Ieq based on the output of blocks 312, 306, and 304. The equivalent current Ieq is a biased sensed motor current that reflects the actual motor current, as opposed to a small portion of the actual motor current which is passing through the current sense resistors 212 in each phase of the three-phase inverter 210. The three-phase inverter 210 controls the brushless motor (e.g., the motor 102), and the FPGA 204 controls the three-phase inverter 210.

At block 316, the processor 202 determines a time to trip, which is based on information related to the specific motor type/make/model made available by the motor's manufacturer. For example, a thermal profile of the motor is provided by the motor's manufacturer (e.g., a temperature versus time graph). Using this information, the equivalent current Ieq is used to determine an equivalent temperature at which the motor is operating at and, from that temperature, the processor 202 determines how long (i.e., the time to trip) the motor can operate safely (e.g., before damage occurs).

At block 318, based on the time to trip, a TCU (thermal capacity used) at the time interval is determined for the motor 102. At block 320, the TCU from block 318 is stored in a memory as a "current_value." This value is used to determine, at block 322, whether the motor 102 is at a thermal limit (based on the manufacturer's information for the motor). If the motor 102 is at its thermal limit, a hard fault is triggered at block 324. However, if the motor is not at its thermal limit, it is then determined whether the motor 102 is nearing its thermal limit at block 326. For example, if the current_value for the TCU is within a certain threshold (e.g., 3%, 5%, 10%, etc.) of the motor's thermal limit, the motor is considered near its thermal limit, and a soft temp fault is triggered to the FPGA at block 328. The soft temp fault sends an initial alert to the FPGA 204 that the motor is moving towards a hard fault state. Otherwise, the motor 102 is not considered near its thermal limit and the motor current is sensed again at block 308. This allows for monitoring the motor 102 over time to detect increases in the motor's operating temperature to determine whether the motor is nearing its thermal limit over time.

Continuing to block 330, it can be determined whether the motor is in an error state because the motor 102 is stalled or stopped. A stopped motor is a purposeful stop, namely that the three-phase inverter 210 is not driving the motor 102 and the motor 102 is not moving. A stalled motor is a non-purposeful stop, namely that the three-phase inverter 210 is driving the motor 102 but the motor 102 is not moving. In a stalled case, excessive current could be drawn, which could be caused by a short circuit, a failed component, etc.

Based on the equivalent current Ieq, the processor 202 determines, at block 330, whether the motor is stopped. For example, the motor is stopped (i.e., not moving) if the equivalent current Ieq=0. If at block 330 the motor is stopped, a cold motor cooling constant is chosen at block 336. The cold motor cooling constant is based on the information related to the specific motor type/make/model made available by the motor's manufacturer. Based on the cold motor cooling constant, at block 338 a motor start lockout time is calculated, which is a period of time that the motor 102 should be given to sit stationary before it is restarted. As an example, the motor start lockout time is a few seconds, minutes, a few hours, etc. depending on how hot the motor is and how long it needs to cool. The motor stop lockout time can be determined from a previous start TCU stored in a memory, an available thermal capacity, and a rate of temperature change. If, at block 340, the motor start lockout is enabled, a hard fault is sent to the FPGA at block 324 and the gate enters a safe state. However, if at block 340 the motor lockout is not enabled, the motor is powered back on, and the method 300 proceeds again from 302.

Returning to block 330, if the motor is not stopped, it is determined at block 332 whether the motor is stalled. As an example, the motor is stalled if the equivalent current Ieq>=Ilr, where Ilr is a linear region current that is based on the information related to the specific motor type/make/model made available by the motor's manufacturer. If the motor 102 is determined to be stalled at block 332, a hard fault is sent to the FPGA 204, which enters a safe state for the motor 102 to prevent damage to the motor 102. When the hard fault is sent to the FPGA, the gate crossing mechanism enters a safe state. For an entrance gate, the gate 104 lowers; for an exit gate, the gate 104 raises. Once the hard fault is triggered to block 324, a lockout period starts (see, e.g., blocks 338, 340) and the motor 102 remains in the safe state until it has had sufficient time to cool down, at which point the motor 102 (and the method 300) can be restarted. If, at block 332, it is determined that the motor 102 is stalled, a hot motor cooling constant is determined at block 334. The hot motor cooling constant is based on the information related to the specific motor type/make/model made available by the motor's manufacturer.

The embodiments described herein may be implemented as one or more systems, methods, and/or computer program products at any possible technical detail level of integration. The computer program product may include a computer readable storage medium (or media) having computer readable program instructions thereon for causing a processor to carry out aspects of the present invention.

The various components, modules, blocks, engines, etc. described herein can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the various components, modules, blocks, engines, etc. described herein can be a combination of hardware and programming. The programming can be processor executable instructions stored on a tangible memory, and the hardware can include a processing device for executing those instructions. Thus a system memory can store program instructions that when executed by the processing device implement the engines described herein. Other engines can also be utilized to include other features and functionality described in other examples herein. In examples, the features and functions described herein can be implemented as an algorithm in an FPGA using a hardware description language. That is, one or more of the blocks of the method 300 can be implemented on or using an FGPA according to one or more embodiments described herein. Similarly, one or more of the blocks of the method 300 can be implemented on or using a general purpose processor, either individually and/or in combination with an FPGA, as described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus (including, for example, an FPGA), create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for thermal lockout for a motor of a gate crossing mechanism, the method comprising:
   monitoring a motor current across a sense resistor of the motor;
   determining a present thermal capacity unit (TCU) at a time interval based on the motor current across the sense resistor;
   determining whether the motor is at a thermal limit by comparing the present TCU to an expected TCU; and
   responsive to determining that the motor is at the thermal limit, causing initiating a hard fault.

2. The computer-implemented method of claim 1, wherein the expected TCU is based on a type of the motor.

3. The computer-implemented method of claim 1, further comprising:

responsive to determining that the motor is not at the thermal limit, determining whether the motor is within a threshold of the thermal limit; and responsive to determining that the motor is within the threshold of the thermal limit, initiating a soft fault.

4. The computer-implemented method of claim 1, wherein the motor is a three-phase, brushless motor.

5. The computer-implemented method of claim 1, further comprising:

subsequent to initiating the hard fault, waiting a motor stop lockout time before restarting the motor; and subsequent to the motor start lockout time expiring, restarting the motor.

6. The computer-implemented method of claim 1, further comprising:

determining whether the motor is stopped;

responsive to determining that the motor is stopped, determining a motor start lockout time based at least in part on information about the motor; and subsequent to the motor start lockout time expiring, restarting the motor.

7. The computer-implemented method of claim 1, further comprising:

determining whether the motor is stalled; and responsive to determining that the motor is stalled, causing initiating the hard fault.

8. The computer-implemented method of claim 7, wherein the hard fault is initiated by a field-programmable gate array.

9. A system comprising:

a memory comprising computer readable instructions; and a processing device for executing the computer readable instructions, the computer readable instructions controlling the processing device to perform operations for thermal lockout for a motor of a gate crossing mechanism, the operations comprising:

monitoring a motor current across a sense resistor of the motor;

determining a present thermal capacity unit (TCU) at a time interval based on the motor current across the sense resistor;

determining whether the motor is at a thermal limit by comparing the present TCU to an expected TCU; and responsive to determining that the motor is at the thermal limit, causing initiating a hard fault.

10. The system of claim 9, wherein the expected TCU is based on a type of the motor.

11. The system of claim 9, wherein the operations further comprise:

responsive to determining that the motor is not at the thermal limit, determining whether the motor is within a threshold of the thermal limit; and responsive to determining that the motor is within the threshold of the thermal limit, initiating a soft fault.

12. The system of claim 9, wherein the motor is a three-phase, brushless motor.

13. The system of claim 9, wherein the operations further comprise:

subsequent to initiating the hard fault, waiting a motor stop lockout time before restarting the motor; and subsequent to the motor start lockout time expiring, restarting the motor.

14. The system of claim 9, wherein the operations further comprise:

determining whether the motor is stopped;

responsive to determining that the motor is stopped, determining a motor start lockout time based at least in part on information about the motor; and subsequent to the motor start lockout time expiring, restarting the motor.

15. The system of claim 9, wherein the operations further comprise:

determining whether the motor is stalled; and responsive to determining that the motor is stalled, causing initiating the hard fault.

16. The system of claim 9, wherein the hard fault is initiated by a field-programmable gate array.

17. A computer program product comprising a non-transitory computer readable storage medium having program instructions embodied therewith, the program instructions executable by a processor to cause the processor to perform operations for thermal lockout for a motor of a gate crossing mechanism, the operations comprising:

monitoring a motor current across a sense resistor of the motor;

determining a present thermal capacity unit (TCU) at a time interval based on the motor current across the sense resistor;

determining whether the motor is at a thermal limit by comparing the present TCU to an expected TCU; and responsive to determining that the motor is at the thermal limit, causing initiating a hard fault.

18. The computer program product of claim 17, wherein the expected TCU is based on a type of the motor.

19. The computer program product of claim 17, wherein the operations further comprise:

responsive to determining that the motor is not at the thermal limit, determining whether the motor is within a threshold of the thermal limit; and responsive to determining that the motor is within the threshold of the thermal limit, initiating a soft fault.

20. The computer program product of claim 17, wherein the motor is a three-phase, brushless motor.

* * * * *